Dec. 12, 1939.    R. M. SCOTT    2,182,972
SEAL
Filed Oct. 29, 1937

INVENTOR
ROBERT M. SCOTT
BY
ATTORNEY

Patented Dec. 12, 1939

2,182,972

UNITED STATES PATENT OFFICE 2,182,972

SEAL

Robert M. Scott, Windsor, Ontario, Canada

Application October 29, 1937, Serial No. 171,722

1 Claim. (Cl. 288—3)

This invention relates to a packing and more particularly to a packing member which may be inserted as a unit in a housing surrounding a centrally located shaft.

An object of the invention is to provide an inexpensive structure which may be assembled with a minimum number of parts, and to provide means for sealing the packing member with the outer periphery of the cage member.

A further object of the invention is to provide a seal wherein the securing members for the packing member exert an outwardly radially directed pressure on the outer periphery of the packing member to force it into sealing engagement with the inner periphery of the retainer member.

Other objects and advantages of the invention will be more apparent from the following description taken in connection with the accompanying drawing, in which.

Figure 1:
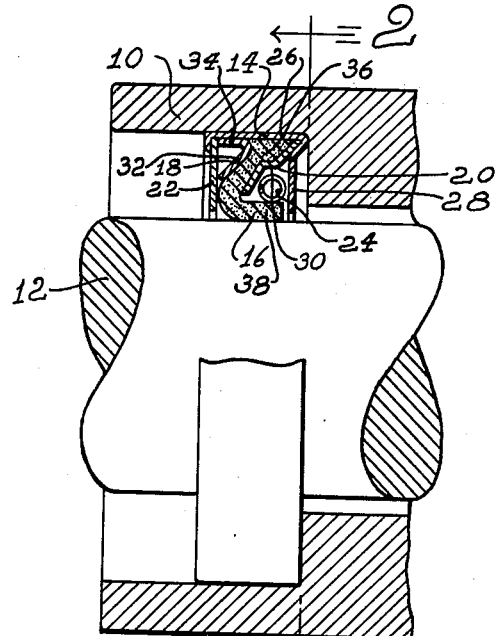
Fig. 1 is a longitudinal sectional view through a housing illustrating the improved seal in encompassing relation with a shaft, the latter being shown in elevation and the seal and housing in section.
Figure 2:
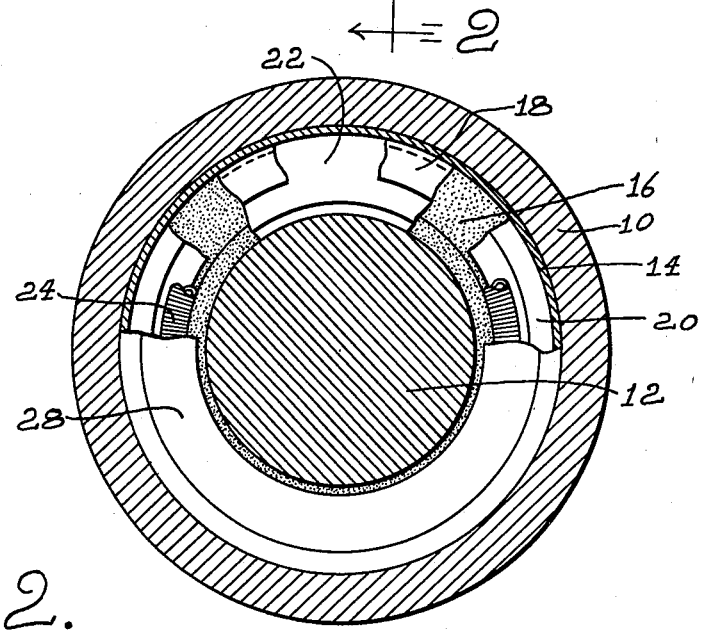
Fig. 2 is a sectional vew taken on the line 2—2 of Fig. 1.

Referring to the drawing, the improved seal is adapted to be inserted in a housing 10 in encompassing relation to a centrally located shaft 12. The seal consists of an annular metallic retainer 14, a packing member 16, spacing members 18 and 20, a flat washer 22, and a coil spring 24.

The retainer 14 has an axially extending peripheral wall 26 and an apertured bottom wall 28 for receiving the shaft 12. At the juncture of the walls 26 and 28 the wall 28 is bent slightly inwardly for a short distance and in right angular relationship to the wall 26. The washer 20 extends diagonally from the juncture of the walls 26 and 28 toward the opposite end of the seal and toward the shaft, with its intermediate portion 30 bent to extend substantially parallel to the wall 26.

The spacer member 18 is angularly shaped, having a diagonally extending flange 32 and an axially extending flange 34. The latter flange is in contact with the inner periphery of the wall 26 and is parallel thereto. The flange 32 extends diagonally outwardly and inwardly substantially parallel to the spacing member 20.

The packing member 16 has an upwardly and inwardly extending flange 36 arranged between the spacing members 18 and 20, and an axially extending flange 38 adapted for engagement with the shaft 12. The coil spring 24 is positioned on the outer periphery of the flange 38 and in the space provided between the spacer 20 and the bottom wall 28 of the retainer 14. The washer 22 is positioned against the free edges of the spacer 18 and the packing 16.

When the seal is assembled the retainer 14 is provided by stamping or otherwise forming a cup-shaped member having the bottom wall 28 thereof depressed as shown. The spacer 20 is positioned with its upper edge in contact with the angularly disposed bottom wall, the packing inserted against the spacer 20, the spacer 18 inserted against the packing member, the washer 22 against the free edges of the spacer 18 and packing member 16, and the outer edge of the wall 26 bent radially inwardly into tight engagement with the washer 22 thereby forcing the parts together and pinching the flange 36 of the packing 16 between the spacers 18 and 20 forcing the outer free edge of the packing member into sealing engagement with the inner periphery of the wall 26.

Various changes, including the size, shape and arrangement of parts, may be made without departing from the spirit of the invention and it is not my intention to limit the scope thereof other than by the terms of the appended claim.

What I claim is:

A self-contained seal comprising a cup-shaped member having an outer axially extending wall and a radially extending wall, a radially extending washer spaced axially from said radially extending wall and held against outward displacement by a radially extending flange on said axially extending wall, an annular spacer of V cross sectional shape having its free ends in engagement with the inner face of said washer and one of its sides parallel to and in contact with said axially extending wall, a spacer having an intermediate portion disposed substantially parallel to said axially extending wall and spaced therefrom and having oppositely disposed portions each extending generally obliquely with respect to the axis of said seal, and a packing member having a diagonally extending flange and an axially extending flange, said diagonally extending flange being held between said spacers and in engagement with said parallel disposed and obliquely extending portions of said last mentioned spacer.

ROBERT M. SCOTT.